Aug. 14, 1962  P. FAHLENBERG  3,049,064
PHOTOGRAPHIC SHUTTER
Filed Nov. 21, 1957
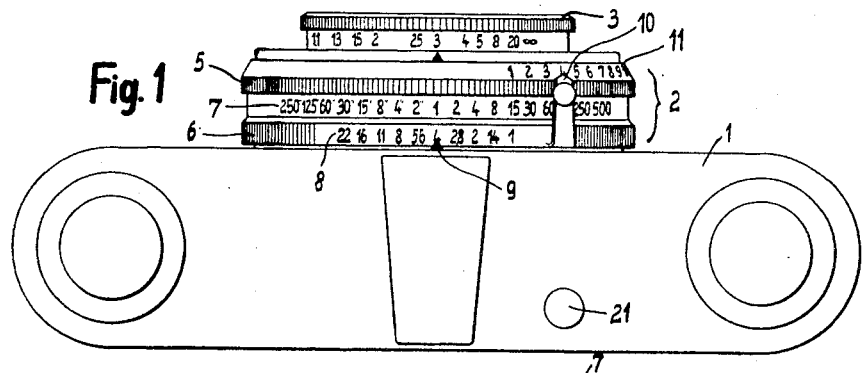
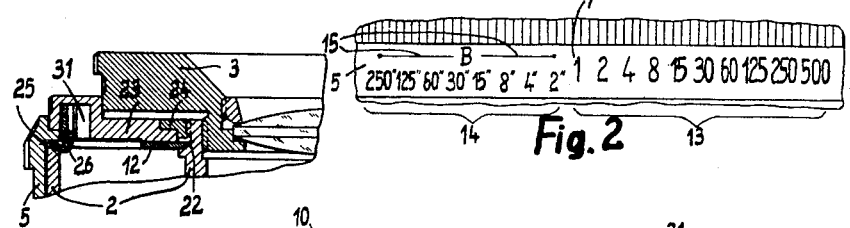
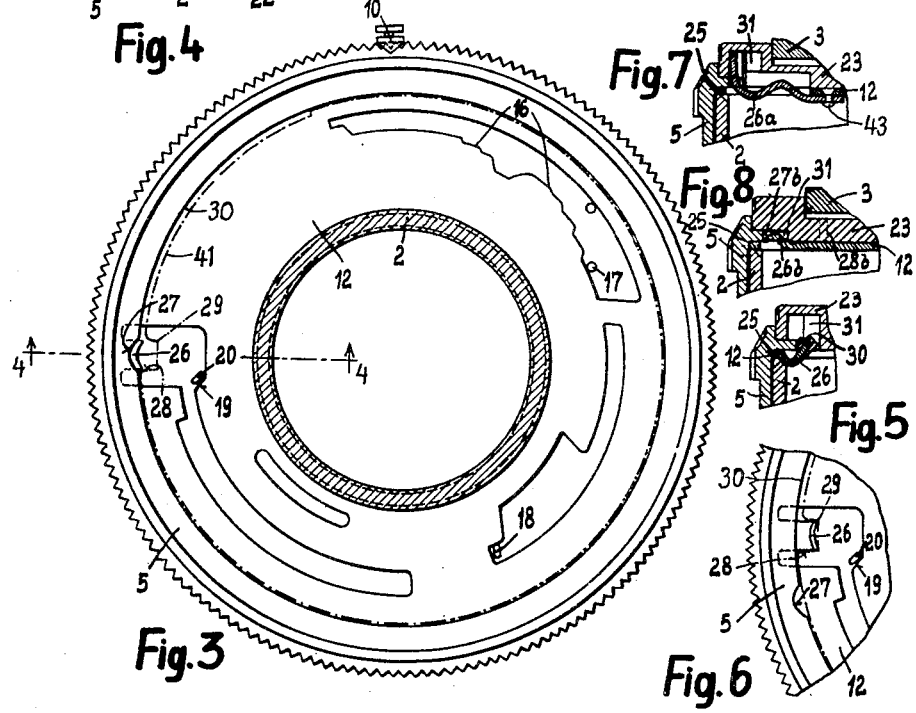

3,049,064
PHOTOGRAPHIC SHUTTER
Paul Fahlenberg, Baierbrunn, near Munich, Germany, assignor, by mesne assignments, to Compur-Werk Friedrich Deckel oHG, Munich, Germany, a firm of Germany
Filed Nov. 21, 1957, Ser. No. 697,995
Claims priority, application Germany Nov. 24, 1956
1 Claim. (Cl. 95—53)

This invention relates to a photographic shutter of the objective type, and particularly to one in which coupling means is provided for coupling the adjusting means for diaphragm aperture to the adjusting means for shutter speed, although the invention may also be useful in shutters which do not have such coupling means.

Modern objective shutters of the kind used on high grade cameras have a considerable range of automatically timed shutter speeds; that is, speeds which are timed automatically by the internal retarding mechanism built into the shutter. Ordinarily the slowest shutter speed (i.e., maximum duration of exposure) which can be timed automatically, is one second. When a longer exposure than this is necessary, the shutter adjusting or control parts must be set for what is known as a time exposure (usually denoted a T exposure) or a bulb exposure (usually denoted a B exposure) and then the photographer must open and close the shutter blades by manual actuation of the proper parts, for any interval or duration of exposure that may be required, greater than one second. The tendency in recent years has been to eliminate the T setting as a separate setting position, and to rely on the B or bulb setting for all manually timed or non-automatic exposures.

To enable the duration or speed of manually timed exposures to be calculated more readily, it has already been suggested that the shutter be provided with a graduated scale which includes appropriate graduations for the longer exposures which are to be timed manually or externally, as well as graduations for the shorter exposures which are automatically timed by the internal mechanism of the shutter. The graduated scale for these longer exposures is sometimes caled an overtime scale, or excess time scale, or extended time scale. Such a scale is particularly useful in shutters where a speed scale member may be coupled to a diaphragm aperture scale member for conjoint movement therewith. However, in the previously suggested shutters of this general kind, there have been various drawbacks or undesirable features, such as the requirement that the coupling between the diaphragm aperture scale member and the shutter speed scale member be disconnected in order to make effective use of the overtime scale, or the requirement that after observing the duration of a manually timed exposure from the overtime scale, the parts be returned to some other position before making the actual exposure.

An object of the present invention is the provision of a generally improved and more satisfactory shutter of this kind above mentioned.

Another object is the provision of a shutter of the general kind above mentioned, so designed and constructed that in a simple construction with a minimum number of parts, the overtime scale can be effectively used for determining the duration of a manually timed exposure, without the need for disconecting the coupling between the shutter speed scale and the diaphragm aperture scale, and without moving the scale parts to a different position after determining the duration of exposure and before making the exposure.

Still another object is the provision of a shutter of simple and inexpensive construction, in which the shutter speed scale member may be moved to a position indicating the required duration of exposure under given conditions, and may be left in this position during the making of the exposure, regardless of whether it be a relatively short exposure which is automatically timed by the internal mechanism of the shutter, or whether it be a relatively long exposure which is externally or manually timed.

A further object is the provision of a shutter having some or all of the various advantages and features above mentioned, so designed and constructed as to have a shutter speed scale ring separate from a shutter speed setting ring, the two rings being detachably coupled to each other by coupling means entirely enclosed within the shutter mechanism so as to be protected from access of dust or dirt, and to be protected from accidental mishandling by inexperienced persons.

A still further object is the provision of a shutter construction having the above mentioned features and advantages, so designed as to be enclosed within a shutter casing of the modern circular configuration, having an attractive appearance which is in harmony with the modern trend in shutter design.

These and other desirable objects may be attained in the manner disclosed as an illustrative embodiment of the invention in the following description and in the accompanying drawings forming a part hereof, in which:

FIG. 1 is a top plan view of a photographic camera equipped with a shutter in accordance with the present invention;

FIG. 2 is a view similar to a fragment of FIG. 1, illustrating an alternative form of marking for the shutter speed scale;

FIG. 3 is a front view of the shutter with many parts omitted and certain overlying parts removed to show the construction beneath;

FIG. 4 is a radial section taken approximately on the line 4—4 of FIG. 3;

FIG. 5 is a view similar to a fragment of FIG. 4, showing the parts in a different position;

FIG. 6 is a view similar to a fragment of FIG. 3, showing the parts in the same position indicated in FIG. 5;

FIG. 7 is a view similar to a fragment of FIG. 4, illustrating another embodiment of the invention; and FIG. 8 is another view similar to a fragment of FIG. 4, illustrating still another embodiment.

The same reference numerals throughout the several views indicate the same parts.

Referring first to FIG. 1 of the drawings, there is shown somewhat schematically a photographic camera having a main body 1, on the front wall of which is an objective shutter indicated in general at 2, the shutter structure carrying at its front a lens mount 3 which, upon rotation about the optical axis of the shutter, serves to focus at least the front component of the lens, in order to focus accurately upon objects at various distances from the camera. The focus distance, expressed in suitable units of measurement (expressed in meters in the example here shown) is read from a focus distance scale marked circumferentially on the lens mount 3, in conjunction with a fixed reference point or index mark near the front of the shutter housing.

The shutter structure includes the usual circular annular casing commonly found in objective shutters, having a stationary outer cylindrical wall and an annular inner wall or lens tube. In a rather general way the shutter may correspond, except for the differences herein pointed out, to the shutter disclosed in U.S. Patent 1,687,123, granted October 9, 1928, for an invention of Deckel and Geiger.

Rotatably mounted near the front of the shutter casing or housing is a shutter speed scale ring 5 extending circumferentially around the circular housing, and provided with an upstanding circumferential rib having serrations or knurling for easy manual grasping in order to turn the ring. To the rear of the serrated rib, the ring 5 has a cylindrical part which carries the shutter speed scale 7. Rearwardly of the ring 5 there is another rotatable ring 6 which surrounds the shutter housing and serves, upon rotation, to adjust the diaphragm aperture in known manner. The diaphragm aperture ring 6 also has an upstanding circumferential rim which is serrated through most of its circumference, for easy grasping and manual turning, but part of the circumferential length of the rim is smooth rather than serrated, so as to carry the diaphragm aperture scale 8. Both the shutter speed scale 7 and the diaphragm aperture scale 8 are read from a fixed reference point or index mark 9 suitably marked on the camera body or on a stationary pointer fastened to the camera body or the shutter housing.

Both of the scales 7 and 8 are what may be called logarithmic linear scales, and are so related to each other as to be complementary. That is, the successive graduations of each scale are evenly spaced at constant angular distances from each other, and the values represented by successive graduations on each scale differ from each other by a constant factor (e.g., the factor of 2) in such manner that if the two rings 5 and 6 are turned jointly through the same angle, the shutter speed indicated by the scale 7 will be changed by the correct amount to compensate for the change in the diaphragm aperture as indicated by the scale 8, and vice versa. This is fully explained in the copending United States patent application of Kurt Gebele, Serial No. 389,775, filed November 2, 1953, now Patent 2,829,574, granted April 8, 1958. The numerical markings of the speed scale are preferably rounded off to approximate values; e.g., 30, 60, 125, and 250, rather than 32, 64, 128, and 256. The diaphragm aperture scale is, of course, marked in the customary $f$ numbers, and the successive numerical values differ from each other by the factor of the square root of 2, so that the aperture areas themselves differ from each other by the factor of 2.

The ring 5 bearing the shutter speed scale 7, and the ring 6 bearing the diaphragm aperture scale 8, are preferably coupled to each other by a releasable but normally effective coupling, so that when either of these rings is turned, the other will normally turn with it through the same angular extent. The coupling means is preferably in the form of a resilient tongue 10 secured to the ring 6 and extending forwardly, in a direction parallel to the optical axis, to engage resiliently with the serrations on the circumferential rib of the ring 5. The tongue 10 is resilient in a radial direction but rigid in a circumferential direction, and engages with the ring 5 with sufficient force so that normally the turning of either ring will result in corresponding turning of the other. However, if one ring is firmly held and the other is turned, then the front end of the tongue 10 will slip over the serrations on the ring 5 so that the two rings may be adjusted to a new position of orientation with respect to each other, particularly if the fingernail is placed under the small knob on the tongue 10 to lift it up slightly away from the ring 5.

While this resilient tongue is the preferred form of coupling means according to the present invention, it is within the scope of the present invention to couple the rings 5 and 6 to each other by any other suitable form of coupling means, e.g., the coupling means disclosed in the copending United States patent applications of Kurt Gebele, Serial No. 507,703, filed May 11, 1955 (now Patent 2,887,940, granted May 26, 1959), or Serial No. 510,299, filed May 23, 1955, now abandoned.

The forward part of the shutter speed scale ring 5, forwardly of the serrated rib thereof, is preferably of frustoconical shape, as shown, and carries the exposure value scale 11 which is read in conjunction with the pointed forward end of the coupling tongue 10, in order to show the relative positions of orientation of the two rings with respect to each other, regardless of the absolute setting or position of either of these rings. The use of an exposure value scale of this kind, and the advantages flowing from such use, have been fully disclosed in the above mentioned copending application No. 389,775 (now Patent 2,829,574) and have subsequently become familiar to many photographers.

According to the present invention, the shutter speed scale 7 includes not only the shutter speeds or exposure times which are automatically controlled by the internal mechanism of the shutter, but also a number of longer exposure times, on what may be called the overtime portion or extended time portion of the scale, representing non-automatic exposure times which must be externally or manually timed, as by a stop watch or by counting, for exposures too long to be timed by the internal mechanism of the shutter. The part of the scale from the numeral 1 rightwardly to the numeral 500 represents the automatically timed part or range of the scale, and the numerals represent, as customary, the denominators of fractional parts of one second. Thus the scale marking "8" means ⅛ of a second, and the numeral "125" means ¹⁄₁₂₅ of a second, and so on. In the overtime or extended part of the scale 7, however, to the left of the numeral 1, the numerals represent whole seconds rather than fractions. To avoid confusion between the two parts of the scale, the symbol for seconds (″) is preferably placed adjacent each numeral of the overtime part of the scale, or the numerals of this part of the scale may be marked in a different color from the numerals of the regular or automatically timed part of the scale.

In conventional shutters, the external ring which carries the shutter speed scale is either integral with or permanently connected to the shutter speed setting mechanism, so that whenever the external ring carrying the scale is turned, the internal shutter mechanism is moved to a different position of speed adjustment. Thus for example in said Deckel and Geiger Patent 1,687,123, the external ring 63 which carries the shutter speed graduations 64 is an integral part of a rotatable cam (see FIG. 2 of the patent drawings) which controls the shutter speed. According to the present invention, however, the ring carrying the speed scale is no longer integral with the cam which internally controls the shutter speed, but is made separate from such cam, and is coupled to the cam to turn the cam throughout the range of the normal or automatically timed part of the shutter speed scale, but is uncoupled or operatively disconnected from the cam when the speed scale ring is turned through the overtime or extended time portion of the scale. This enables the speed control cam to remain in a single "B" or "bulb" position while the scale ring 5 turns to one or another of its positions in the overtime part of the scale, and enables the photographer to leave the scale ring in the position showing the correct duration of overtime exposure, while the exposure is being made. It is not necessary to rely upon memory for the proper duration of the exposure, for the exposure speed may be read directly from the scale 7 at any time during the progress of the long exposure.

In the present instance, the shutter speed setting ring, that is, the cam or other parts which control the timing or speed of the shutter, is indicated at 12 in FIGS. 3 and 4, and rotates concentrically around the optical axis. It corresponds approximately in function to the member 63 of said Deckel and Geiger patent, except that the outer part carrying the shutter speed scale (in said Deckel and Geiger patent) is omitted, and the speed ring 12 is made of smaller diameter than the outer wall of the casing or housing so as to be enclosed entirely within the shutter casing, rather than projecting beyond the outer wall of the casing as was the case in the Deckel and Geiger patent.

This ring 12 is provided with the usual cam surfaces to control the duration of automatically timed exposures, and to set the shutter for bulb or "B" exposures when required. Thus, for example, the ring 12 may have a stepped cam portion 16 serving to control the position of a pin 17 on any suitable part of the operating mechanism of the shutter, e.g., on the adjustable gear segment of the clockwork timing or delaying mechanism within the shutter. It may also have a cam portion for controlling the position of what is sometimes called the anchor plate lug 18, which is a lug on the vibrating or oscillating anchor or escapement member of the clockwork gear train. It may also have a cam portion 19 for cooperating with the lug 20 on the bulb lever, the shutter being set for bulb (or manually timed) operation when the lug 20 is in the position shown in FIGS. 3 and 6, and being set for ordinary or internally timed exposures when the lug 20 is shifted slightly radially outwardly from the position shown in FIGS. 3 and 6, resting on the portion of the cam which lies in a counterclockwise direction from the lug 20. When the lug 20 is in the position shown in FIG. 3, so that the shutter is set for "B," then the shutter blades remain open so long as the shutter release member is held in the pressed position, and they close again when the shutter release member is allowed to rise to its normal position.

Merely as a convenient example, the shutter release member is here shown as what is called a body release, that is, one which is located on the camera body, rather than on the shutter housing. It is indicated diagrammatically as a plunger 21 (FIG. 1) which is operatively connected to the internal mechanism of the shutter by any suitable known form of linkage or connection, the details of which are unimportant so far as the present invention is concerned.

As customary in objective shutters, the bulb position is placed next to one end of the normal or internally timed part of the range of movement of the shutter speed controlling member 12. In the present instance, the bulb position is at the longest exposure or slowest speed end of the normal range of movement, one position or step beyond the longest or one second exposure which is timed internally. That is, when the ring 5 is turned one step to the right (view as in FIG. 1) from the setting shown in FIG. 1, so as to bring the 2 second (externally timed) scale graduation opposite the pointer 9, then the shutter is set for bulb exposure. This is the position of the parts shown in FIG. 3. Any further turning of the ring 5 still further to the right, view as in FIG. 1 (or turning it counterclockwise when viewed as in FIG. 3) will now result, according to the present invention, in uncoupling the shutter speed scale ring 5 from the shutter speed setting ring or cam ring 12, so that the cam ring 12 remains set in the above mentioned bulb position, while the scale ring 5 is free to turn to bring other graduations of the overtime part of the scale opposite the reference mark 9.

In order to accomplish this coupling and uncoupling of the external speed scale ring 5 with reference to the internal speed setting ring 12, and yet to protect the coupling parts from entrance of dust and dirt and from undesired handling, and to preserve the neat modern and enclosed design, the following construction is preferably employed: There is an annular front cover plate 23, corresponding in general to the front cover plate 141 of said Deckel and Geiger patent, and overlying the front of the ring 12 and a flange on the ring 5. This cover plate 23 is held in position by a nut 24 screwed on external threads at the front end of the lens tube of the shutter, and the cover plate holds the ring 12 seated against a shoulder 22 on the lens tube, which may form a centering bearing for the rotation of the ring 12. The outer edge of the ring 12 may bear lightly against an internal cylindrical surface 25 on the external ring 5, to serve to center the ring, although of course the ring can be centered by engaging snugly and rotatably on the outer face of the cylindrical part of the shutter housing, and in fact the ring 5 may, through its engagement with the ring 12, serve to center the ring 12 itself, if desired.

For coupling the two rings 5 and 12 together during the internally timed or "automatic exposure" range of movement of the former, the ring 12 is provided with a resilient coupling tongue 26 which is, for instance, punched out and bent from the sheet metal of which the ring 12 is formed. In one and only one position of relative orientation of the rings 5 and 12, the resilient tongue 26 engages in a coupling notch 27 on the inner periphery of the shutter speed scale ring 5. The tongue engages the notch with sufficient force so that the ring 12 will be turned from the turning motion of the ring 5.

The stationary cover plate 23 has a radially extending abutment or stop surface 28 (shown in dash-dot lines in FIGS. 3 and 6) which engages with a forwardly extending part of the tongue 26 to prevent further counterclockwise movement of this tongue (when viewed from the front of the shutter, as in FIG. 3) when the ring 12 is brought to the "B" position, which is the position shown in FIG. 3 and one step to the right of the position shown in FIG. 1.

If it is now attempted to turn the shutter speed scale ring 5 still further in its counterclockwise direction, the coupling tongue 26 cannot move in a counterclockwise direction because it engages the stationary stop surface 28, and so the counterclockwise movement of the ring 5 serves to cam the tongue 26 resiliently out of the notch 27, forcing it radially inwardly toward the optical axis of the shutter, into a recess 29 formed in the cover plate 23. Such a position of the parts is illustrated in FIG. 6, where it will be seen that the notch 27 on the ring 5 has moved further counterclockwise from the position shown in FIG. 3. The tongue 26, now seated in the locking notch 29 of the stationary cover plate, is latched thereby in the "B" position so that any further rotation of the external ring 5 in either direction will not cause any rotation of the internal ring 12. The circular surface 30 at the inner edge of the ring 5 slides past the tongue 26 and holds the tongue in its inward position in the locking notch 29. Thus the external ring 5 can be moved as far as desired to carry any desired graduation of the overtime part of the scale 7 to a position opposite the index mark 9, in order to indicate the desired length of a non-automatic exposure which must be externally timed. It can also remain in this position since the speed setting cam ring 12 is in any event in the position which produces a bulb exposure.

In the particular setting shown by way of example in FIG. 1, the shutter is set for an exposure of one second (being the longest exposure which may be automatically or internally timed) and for a diaphragm aperture of $f:4$. As seen of the scale 11, this represents an exposure value setting of 4. If, with this same exposure value setting, it is desired to use a smaller aperture (e.g., to obtain a greater depth of field) then the rings 5 and 6 may together be turned to the right without changing the relative orientation of the rings 5 and 6 with respect to each other, and without changing the exposure value. The first step to the right from the position shown in FIG. 1 will set the diaphragm for an aperture of $f:5.6$, and will set the shutter speed scale to indicate that the exposure should have a duration of two seconds, at the same time setting the internal mechanism of the shutter for a "B" or bulb exposure, and bringing the coupling tongue 26 up against the stationary stop or abutment 28. If it is decided to use a still smaller aperture, the movement of both rings 5 and 6 one more step to the right will set the diaphragm for an aperture of $f:8$, while the shutter speed scale will indicate that the exposure should have a duration of 4 seconds. During this movement of the ring 5 from the 2 second to the 4 second position, it becomes uncoupled from the ring 12 in the manner above described, and leaving the ring 12 set in the "B" position. Similarly, further movement to the right can be made if still smaller aperture is desired. In each position, the scale 7 on the ring 5 will indicate visually the necessary length of exposure, when taking a picture with the aperture setting indicated on the scale 8, but the internal setting ring 12 will remain stationary in the "B" position.

Of course for different light conditions, or for using film of a different sensitivity, the ring 5 may be placed in a different position of orientation with respect to the ring 6, to bring any desired graduation of the light value scale 11 opposite the pointer 10. In any setting of the exposure value scale, there will be various pairs of shutter speeds and diaphragm apertures set opposite each other on the respective scales 7 and 8, and the photographer may choose any desired pair. Whatever diaphragm aperture is selected, the scale 7 will always show the proper length of exposure for the selected diaphragm aperture; e.g. (assuming an exposure value of 4) an aperture of f:16 would require an exposure of 15 seconds, or an aperture of f:22 would require an exposure of 30 seconds.

After making one or more non-automatic or externally timed exposures, if it is now desired to make an automatically or internally timed exposure, the ring 5 is turned back in a clockwise direction. During such clockwise rotation, there is no danger of accidentally carrying the ring 12 around with it, by friction, because the tongue 26 is safely locked in the stationary notch 29. When the clockwise rotation of the ring 5 continues to the point where an exposure having a duration of 2 seconds is indicated, the notch 27 comes opposite the tongue 26 and the tongue springs resiliently outwardly away from the optical axis, and seats itself again in the notch 27, thereby releasing itself from the locking notch 29. Further movement of the ring 5 in a clockwise direction will now carry the ring 12 around with the ring 5. During all positions in the automatically timed range, the inner face of the tongue 26 lies against a stationary arcuate surface 41 on the cover plate 23, preventing the tongue 26 from being accidentally cammed out of the notch 27 except in the "B" position where it is intended to be cammed out.

In the construction just described, the coupling tongue 26 is integral with the shutter speed setting member 12 and is formed from the latter by punching and bending. However, it is within the scope of the invention to provide a separate coupling tongue such as shown at 26a in FIG. 7, fastened in any suitable manner to the ring 12, such as being riveted to it at 43. The operation is the same as previously described.

In both types of coupling tongue previously mentioned (FIGS. 3–6, and FIG. 7) the tongue is resilient in a radial direction, that is, toward and away from the optical axis of the shutter. But it is possible also, within the invention, to make the coupling tongue resilient in an axial direction rather than in a radial direction. Such a construction is illustrated in FIG. 8, where the coupling tongue 26b is in the form of a radial lug on the shutter speed setting ring 12, and is provided with a coupling protrusion which engages resiliently in a coupling notch 27b formed on the rear face of a radial flange of the shutter speed scale ring 5.

With this alternative construction, the stationary stop 28 would be in the form of a pin 28b fastened to the stationary cover plate 23 and projecting rearwardly from the rear face thereof, in a direction parallel to the optical axis, so as to engage one side of the radial part of the tongue 26b when it gets to the desired position for uncoupling. Further movement of the scale ring 5 would then force or cam the tongue 26b out of the notch 27b, to uncouple the two rings from each other. When the ring 5 is turned back in the opposite direction, when the notch 27b comes opposite the tongue 26b the tongue will spring back into it on account of its resiliency.

The stationary cover 23 may also be provided with a projecting part which forms a locking notch for holding the tongue 26b when the latter is cammed out of the notch 27b, in a manner similar to the locking notch 29 in the first embodiment. Or as an alternative, the setting ring 12 can be constantly under the influence of a light spring which tends to hold it in the "B" position, with sufficient force to overcome any frictional drag which may tend to turn it away from such position, except when the tongue 26b is definitely seated in the notch 27b, which would cause coupling with sufficient force to overcome the light spring. In either case, whether a light spring is used for the setting ring 12, or whether it is held by means of a locking notch, the result is attained that the return movement of the shutter speed scale ring 5 will not cause any movement of the shutter speed setting ring 12 until the scale ring returns to the position where it is again definitely coupled to the setting ring.

From what has been described above, it will be seen that in each instance the coupling and uncoupling means between the rings 5 and 12 are located in a space 31 lying on the rear face of the stationary cover member 23, internally within the shutter housing so as to be completely shut off from the outside by the covering plate 23. In this way it is possible to keep the coupling connection between the members 5 and 12 quite short and simple, and to develop the parts in a very simple manner. The coupling means thus forms a self-contained unit which is sealed or enclosed against accidental contact from the outside, so as to eliminate the possibility of external influences, as for example damage by inexpert handling. Also, the closed construction of the shutter prevents dust or dirt or other foreign substances from penetrating into the shutter or from reaching the coupling means. Moreover, it is adaptable to a closed construction of shutter which can thus retain the normal modern shutter shape, without having unsightly external accessories or protuberances.

A construction according to the present invention also offers the further advantage that by making the control cam ring 12 as a separate member from the ring 5 which carries the speed scale graduations 7, the ring 12 can be made of very thin sheet metal of high grade, e.g., spring steel, so that it can be formed as a sheet metal stamping with sufficient precision to eliminate any need for subsequent machining or finishing, while the scale ring 5 is formed of a different type of material more suitable for machining on a lathe.

If the shutter speed scale is marked in the manner shown in FIG. 1, there is no definite symbol indicating the "B" or bulb setting, and the user of the shutter will simply have to understand that whenever the shutter is set for an exposure longer than 1 second, it is in condition for "B" operation. If desired, the "B" setting may be indicated graphically by marking the scale in the alternative manner shown in FIG. 2. Here, the numerals in the group 13 indicate fractional parts of a second, for automatically timed exposures, and the numerals in the group 14 indicate whole seconds, for non-automatic or manually timed exposures, just as in the case of the scale in FIG. 1. But in addition to these numerals, the designation "B" is conspicuously marked on the ring 5 above the numerals of the group 14. To show the full extent of the "B" range of settings, lines 15 may extend rightward and leftward from the symbol "B" to the extreme ends of the overtime scale, as shown.

The frictional resistance to rotation of the ring, when camming the tongue 26 out of the coupling notch 27, can be easily felt by the operator's fingers, and thus serves as an additional warning to him that he is passing from the automatically timed range to the non-automatically timed range.

In the embodiments illustrated, the coupling tongue 26 (or 26a or 26b) is formed on the speed control cam ring, and cooperates with a coupling notch on the speed scale ring. However, it is possible to use a reverse arrangement, placing the resilient coupling tongue on the speed scale ring and having it cooperate with a coupling notch on the speed control cam ring. Also it is possible, of course, to use the feature of coupling the speed scale ring to the speed control or cam ring even in those shutters where there is no coupling between the speed scale ring and the diaphragm aperture ring.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

A photographic shutter comprising walls forming a closed annular casing having a central axis, a shutter speed setting cam ring enclosed within said casing and mounted for rotation about said axis, a shutter speed scale ring also mounted for rotation about said axis and having a flange enclosed within said casing and a rim extending circumferentially around said casing externally thereof and accessible for manual grasping and turning, and releasable automatically operating coupling means enclosed within said casing for coupling said cam ring to said scale ring to turn therewith during part of the range of rotary movement of said scale ring and for uncoupling said two rings so that said scale ring may move independently of said cam ring during another part of the range of rotary movement of said scale ring, said coupling means including a resilient tongue on said cam ring, a notch on said scale ring into which said tongue engages during a part only of the range of rotary movement of said scale ring, and stop means for limiting movement of said cam ring so that further rotary movement of said scale ring will force said resilient tongue out of said notch.

References Cited in the file of this patent

UNITED STATES PATENTS

| | | |
|---|---|---|
| 1,623,998 | Cooke | Apr. 12, 1927 |
| 1,687,123 | Deckel et al. | Oct. 9, 1928 |
| 2,938,446 | Singer | May 31, 1960 |

FOREIGN PATENTS

| | | |
|---|---|---|
| 744,962 | Great Britain | Feb. 15, 1956 |